United States Patent
Nishioka et al.

(10) Patent No.: US 12,028,234 B2
(45) Date of Patent: Jul. 2, 2024

(54) CONVERSION DEVICE, CONVERSION METHOD, AND CONVERSION PROGRAM

(71) Applicant: Nippon Telegraph and Telephone Corporation, Tokyo (JP)

(72) Inventors: Takeaki Nishioka, Musashino (JP); Chiharu Morioka, Musashino (JP); Shohei Kamamura, Musashino (JP); Yuhei Hayashi, Musashino (JP); Yuki Miyoshi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/277,028

(22) PCT Filed: Feb. 16, 2021

(86) PCT No.: PCT/JP2021/005778
§ 371 (c)(1),
(2) Date: Aug. 11, 2023

(87) PCT Pub. No.: WO2022/176034
PCT Pub. Date: Aug. 25, 2022

(65) Prior Publication Data
US 2024/0129218 A1 Apr. 18, 2024

(51) Int. Cl.
*G06F 15/16* (2006.01)
*H04L 41/0893* (2022.01)
(Continued)

(52) U.S. Cl.
CPC .......... *H04L 43/18* (2013.01); *H04L 41/0893* (2013.01); *H04L 43/026* (2013.01); *H04L 69/22* (2013.01)

(58) Field of Classification Search
CPC ... H04L 43/18; H04L 43/026; H04L 41/0893; H04L 69/22
(Continued)

(56) References Cited

U.S. PATENT DOCUMENTS 7,290,134 B2 * 10/2007 Buer .................... H04L 63/0485
713/153
7,969,882 B2 * 6/2011 Matsunaga ......... H04L 47/2441
370/230.1
(Continued)

FOREIGN PATENT DOCUMENTS

JP 202088517 6/2020

OTHER PUBLICATIONS

Nishioka et al., "A Proposal of Fast x Flow Proxy System for Traffic Visualization in Carrier Network Accommodating Multiple Telecom Operators," 2021 IEICE General Conference Web Version Program, online, Mar. 9-12, 2021, 3 pages (with machine translation).
(Continued)

*Primary Examiner* — Moustafa M Meky
(74) *Attorney, Agent, or Firm* — Fish & Richardson P.C.

(57) ABSTRACT

A conversion device analyzes an input packet and acquires header information included in the packet. Furthermore, the conversion device classifies packets into one of a plurality of groups on the basis of the acquired header information and set grouping conditions. Subsequently, the conversion device generates packets for analysis on the basis of the processing corresponding to the classified groups.

12 Claims, 7 Drawing Sheets

(51) Int. Cl.
  *H04L 43/026* (2022.01)
  *H04L 43/18* (2022.01)
  *H04L 69/22* (2022.01)
(58) Field of Classification Search
  USPC .......................................................... 709/224
  See application file for complete search history.

(56) References Cited

U.S. PATENT DOCUMENTS

| | | | | |
|---|---|---|---|---|
| 8,166,227 | B2* | 4/2012 | Choi | H04L 1/16 |
| | | | | 710/313 |
| 8,284,776 | B2* | 10/2012 | Petersen | H04L 45/742 |
| | | | | 370/469 |
| 9,253,061 | B2* | 2/2016 | Nagaraj | H04L 43/10 |
| 10,659,571 | B1* | 5/2020 | Volpe | H04L 69/22 |
| 10,666,775 | B1* | 5/2020 | Volpe | H04L 43/50 |
| 10,686,568 | B2* | 6/2020 | Elhaddad | H04L 61/2592 |
| 11,210,406 | B2* | 12/2021 | Moss | G06F 21/6227 |
| 11,570,284 | B2* | 1/2023 | Suzuki | H04L 69/16 |
| 2004/0066746 | A1* | 4/2004 | Matsunaga | H04L 47/20 |
| | | | | 370/252 |
| 2011/0145469 | A1* | 6/2011 | Choi | G06F 13/385 |
| | | | | 714/E11.01 |
| 2014/0075243 | A1* | 3/2014 | Nagaraj | H04L 43/10 |
| | | | | 714/E11.178 |
| 2018/0018469 | A1* | 1/2018 | Moss | H04L 9/14 |
| 2020/0304607 | A1* | 9/2020 | Suzuki | H04L 63/123 |
| 2022/0182361 | A1* | 6/2022 | Hayashi | H04L 63/0236 |
| 2022/0400079 | A1* | 12/2022 | Hayashi | H04L 47/35 |

OTHER PUBLICATIONS

Miyoshi et al., "Format Changing Method for Header Sample in Flow Information Packet," Proceedings of 2020 IEICE General Conference, Higashihiroshima, Japan, Mar. 17-20, 2020, 3 pages (with machine translation).

* cited by examiner

| # | Src IP | Protocol | Src Port | Group |
|---|---|---|---|---|
| 1 | 192.168.0.0/24 | * | * | A |
| 2 | 192.168.1.0/24 | * | * | A |
| 3 | * | TCP | 443 | B |
| 4 | * | UDP | 443 | B |

| # | Src IP | Protocol | Src Port | Group |
|---|---|---|---|---|
| 1 | 192.168.0.0/24 | * | * | A |
| 2 | 192.168.1.0/24 | * | * | A |
| 3 | * | TCP | 443 | B |
| 4 | * | UDP | 443 | B |

EXAMPLE OF CONDITIONS SET BY OPERATOR

↑ OPTIMIZATION

| # | Src IP | Protocol | Src Port | Group |
|---|---|---|---|---|
| 1 | 192.168.0.0/23 | * | * | A |
| 2 | 192.168.1.0/24 | *! | *! | A |
| 3 | * | * | 443 | B |
| 4 | *! | UDP | 443 | B |

EXAMPLE OF OPTIMIZED CONDITIONS

CONVERSION DEVICE, CONVERSION METHOD, AND CONVERSION PROGRAM

CROSS-REFERENCE TO RELATED APPLICATIONS

This application is a National Stage application under 35 U.S.C. § 371 of International Application No. PCT/JP2021/005778, having an International Filing Date of Feb. 16, 2021.

The disclosure of the prior application is considered part of the disclosure of this application, and is incorporated by reference in its entirety into this application.

TECHNICAL FIELD

The present invention relates to a conversion device, a conversion method, and a conversion program.

BACKGROUND ART

There is an xFlow technique of performing packing sampling for network monitoring and traffic trend analysis and aggregating and analyzing traffic by transferring flow statistical information calculated from header information and a header itself (header sample).

Also, as a technique of analyzing an encapsulated packet, there is a format conversion technique of allowing a packet inside a capsule to be extracted and analyzed in a RAW packet and a header sample xFlow packet. Furthermore, there is a technique of registering, in a database, the correspondence between a packet header inside a capsule and a packet header outside the capsule for an encapsulated packet.

CITATION LIST

Non Patent Literature

[NPL 1] Miyoshi and the like, "Header Sample Format Conversion Method in xFlow Packet", 2020 IEICE General Conference, B-6-36, March 2020

SUMMARY OF INVENTION

Technical Problem

However, a format conversion technique in the related art has a problem that it is not possible to perform flexible processing and analysis which varies in accordance with the attributes of the business operator. For example, a format conversion technique in the related art can only perform uniform processing according to an encapsulation format of an input packet and cannot branch processing depending on the contents of the packet headers inside and outside the capsule. Thus, there is a problem that it is not possible to perform different processing or analysis for each attribute of a business operator or the like for encapsulated packets on a network which is used by a plurality of business operators.

The present invention was made in view of the above circumferences, and an object of the present invention is to provide a conversion device, a conversion method, and a conversion program capable of performing flexible processing and analysis which is different for each attribute of a business operator or the like.

Solution to Problem

In order to solve the above problem and to achieve the purpose, a conversion device of the present invention includes: an analysis unit which analyzes input packets and acquires header information included in each of the packets; a grouping unit which classifies the packets into one of a plurality of groups on the basis of the header information acquired using the analysis unit and set grouping conditions; and a generation unit which generates packets for analysis on the basis of processing corresponding to the groups classified using the grouping unit.

Also, a conversion method of the present invention is a conversion method performed by a conversion device including: an analysis step of analyzing input packets and acquiring header information included in each of the packets; a grouping step of classifying the packets into one of a plurality of groups on the basis of the header information obtained through the analyzing step and set grouping conditions; and a generation step of generating packets for analysis on the basis of processing corresponding to the groups classified through the grouping step.

Moreover, a conversion program of to the present invention causes a computer to execute: an analysis step of analyzing input packets and acquiring header information included in each of the packets; a grouping step of classifying the packets into one of a plurality of groups on the basis of the header information obtained through the analyzing step and set grouping conditions; and a generation step of generating packets for analysis on the basis of processing corresponding to the groups classified through the grouping step.

Advantageous Effects of Invention

According to the present invention, it is possible to perform flexible processing and analysis which is different for each attribute of a business operator or the like.

DESCRIPTION OF EMBODIMENTS

Embodiments of a conversion device, a conversion method, and a conversion program according to the present application will be described below in detail with reference to the drawings. Moreover, the present invention is not limited to the embodiments described below.

Embodiment

First, an embodiment will be described. When converting a format of an encapsulated packet, the conversion device 10 according to the embodiment provides a group identifier (group ID) to each packet on the basis of the conditions of either one or both of the packet header outside the capsule (outer header) and the packet header inside the capsule (inner header) set in advance. Also, the conversion device 10 performs different processing for each group, such as deletion of the capsule outer packet header, statistical processing, change of the transmission destination IP address, or the like on the basis of the group ID to enable individual processing and analysis for each attribute of the network use business operator or the like.

[Configuration of Communication System]

Figure 1:
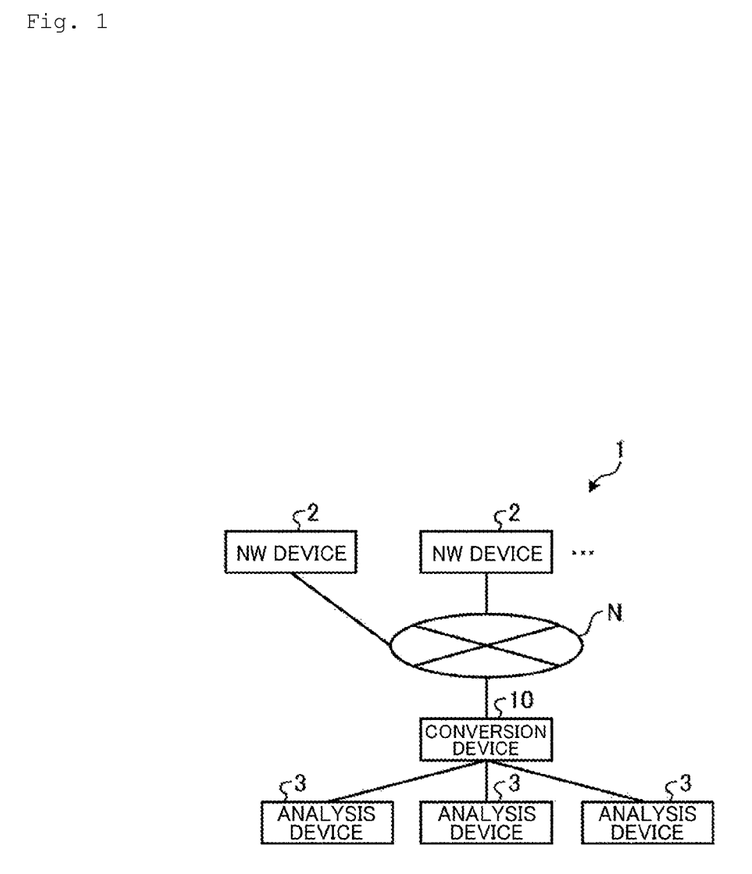
FIG. 1 is a block diagram illustrating an example of a configuration of a communication system according to an embodiment.

FIG. 1 is a block diagram illustrating an example of a configuration of a communication system according to the embodiment. As shown in FIG. 1, a communication system 1 according to the embodiment includes a plurality of NW devices 2, a conversion device 10, and a plurality of analysis devices 3 (external devices). For example, the plurality of NW devices 2 and the conversion device 10 communicate with each other via a network N. Note that the configuration shown in FIG. 1 is merely an example and the specific configuration and the numbers of each device are not particularly limited.

Each of the NW devices 2 samples packets in traffic to be monitored. The NW device 2, for example, may transfer a mirrored encapsulated packet to the conversion device 10 and may cut sampled packet header samples and transfer an xFlow packet obtained by encapsulating the cut header samples to the conversion device 10. At this time, the NW device 2 may transfer statistical information about a flow such as the number of packets to the conversion device 10 by adding it to the xFlow packet to be transferred or as another xFlow packet.

The conversion device 10 converts xFlow packets input from various NW devices 2 into xFlow packets having a format corresponding to the processing content of the external analysis device 3. Specifically, the conversion device 10 identifies header information using protocol analysis and performs grouping on the basis of conditions. Also, the conversion device 10 performs processing defined for each group and transmits the generated packet to the analysis device 3. For example, as processing defined for each group, the conversion device 10 obtains statistics of inner headers of xFlow packets input from various NW devices 2, generates an xFlow packet including at least statistical information indicating the obtained statistics of the inner header, and transmits the generated xFlow packet to the external analysis device 3.

Each analysis device 3 analyzes the traffic to be monitored and aggregates the packets in the traffic to be monitored. For example, the analysis device 3 uses the statistical information included in the xFlow packets converted by the conversion device 10 to perform analysis and aggregation.

[Configuration of Conversion Device]

Figure 2:
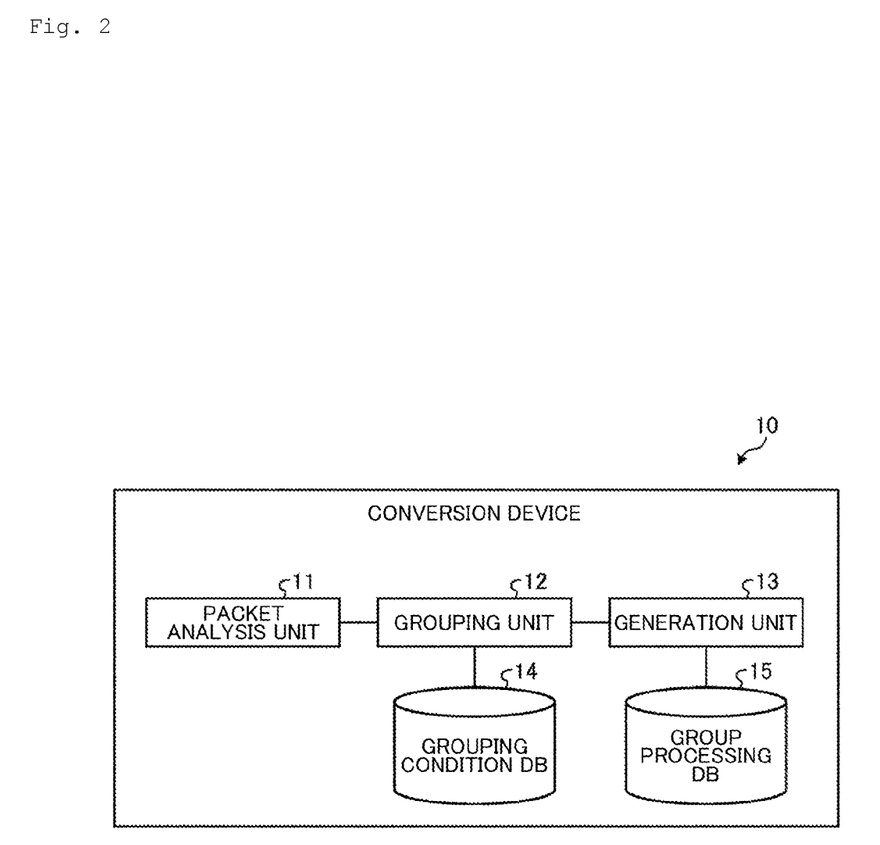
FIG. 2 is a block diagram illustrating an example of a configuration of a conversion device illustrated in FIG. 1.

A configuration of the conversion device 10 will be described below. FIG. 2 is a block diagram showing an example of the configuration of the conversion device 10 shown in FIG. 1.

As shown in FIG. 2, the conversion device 10 has a packet analysis unit 11, a grouping unit 12, a generation unit 13, a grouping condition DB 14, and a group processing DB 15. Note that the conversion device 10 is realized by, for example, reading a predetermined program into a computer or the like including a read only memory (ROM), a random access memory (RAM), a central processing unit (CPU), or the like and executing the predetermined program using the CPU. Furthermore, the conversion device 10 has a communication interface through which various information is transmitted and received between the conversion device 10 and other devices connected via a network or the like. For example, the conversion device 10 has a network interface card (NIC) or the like and performs communication with other devices via electric communication lines such as a local area network (LAN) and the Internet.

A grouping condition DB 14 stores grouping conditions which are conditions for grouping input packets. The grouping conditions are set in advance by an operator and can be changed, added, or deleted as appropriate. Also, the grouping condition DB 14 stores information about either one or both of the outer header and the inner header as grouping conditions.

Figure 3:
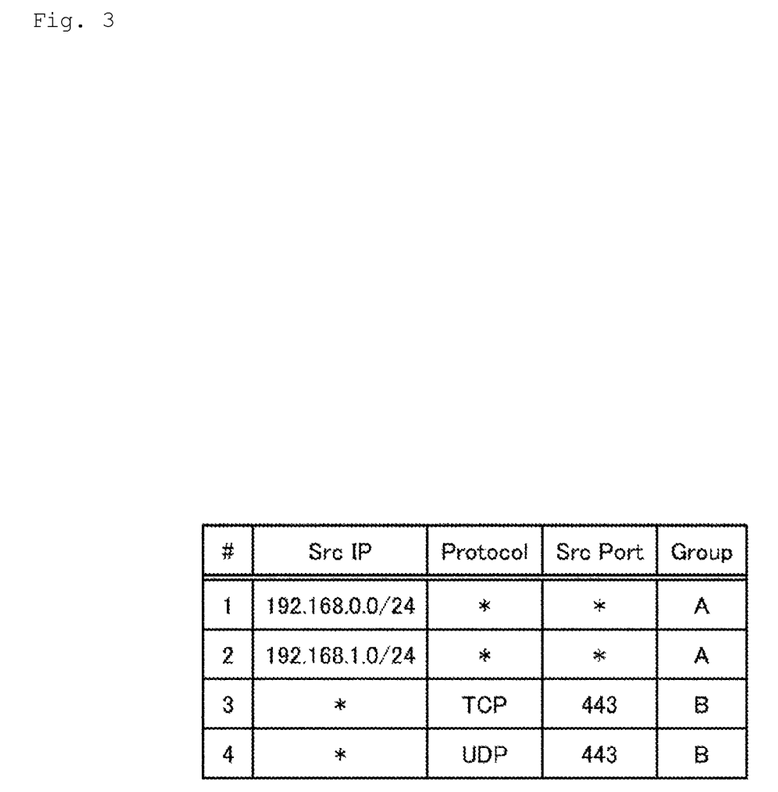
FIG. 3 is a diagram illustrating an example of grouping conditions stored in a grouping condition DB (database).

Here, an example of information stored in the grouping condition DB 14 will be described with reference to FIG. 3. FIG. 3 is a diagram showing an example of the grouping conditions stored in the groping condition DB. In the example of FIG. 3, the grouping condition DB 14 stores the conditions of "Src IP", "Protocol", and "Src Port" included in the inner header as grouping conditions. Note that the grouping conditions are not limited thereto and may include conditions relating to other information included in the inner header, conditions relating to information included in the outer header, or only conditions relating to information included in the outer header.

As illustrated in FIG. 3, the grouping condition DB 14 stores group IDs for identifying groups in association with conditions of "Src IP", "Protocol", and "Src Port" included in the inner header. For example, the grouping conditions illustrated in FIG. 3 are conditions for classifying applicable packets into group ID "A" when the Src IP (source IP address) included in the inner header is within the range of "192.168.0.0/24" or "192.168.1.0/24".

Also, the grouping conditions exemplified in FIG. 3 are conditions for classifying applicable packets into group ID "B" when the protocol is a "transmission control protocol (TCP)" or a "user datagram protocol (UDP)" and the Src Port (source port number) is "443".

The group processing DB 15 stores processing defined for each group. That is, the group processing DB 15 stores details of processing to be performed for each group of packets classified by the grouping unit 12 which will be described later. For example, the group processing DB 15 stores the processing content and the transmission destination of the generated analysis packet in association with the group ID.

The conditions and processes stored in the grouping condition DB 14 and the group processing DB 15 are set in advance by the operator and can be changed, added, and deleted as appropriate. That is, in the conversion device 10, the grouping condition DB 14 and the group processing DB 15 can store conditions for narrowing down packets to be statistically processed and processing for transmitting information necessary for analysis to the analysis device 3 to perform different processing and analysis for each attribute of business operators or the like.

The packet analysis unit 11 analyzes the information of the input packet and acquires the header information included in the packet. For example, the packet analysis unit 11 performs protocol analysis on encapsulated packets or xFlow packets if receiving an input of an xFlow packet including a header sample which is an encapsulated packet (RAW packet) or a header part itself and identifies header information by extracting one or both of the outer header and the inner header.

The grouping unit 12 classifies packets into one of a plurality of groups on the basis of the header information acquired using the packet analysis unit 11 and the set grouping condition. For example, the grouping unit 12 classifies the packets into one of a plurality of groups on the basis of one or both of the outer header and the inner header, which are header information, as grouping conditions. Specifically, the grouping unit 12 refers to the grouping conditions stored in the grouping condition DB 14 and uses one or both of the outer header and the inner header extracted using the packet analysis unit 11 to classify the input packets into groups in which the grouping conditions are satisfied.

The generation unit 13 generates analysis packets corresponding to the groups classified using the grouping unit 12. For example, the generation unit 13 acquires statistics of inner headers as processing corresponding to groups, acquires a process of generating an xFlow packet including at least statistical information indicative of inner header statistics and the statistics of the outer header, removes the process of generating an xFlow packet including at least statistical information indicative of the statistics of the outer header, and performs one or more of the processes of generating (shaping) a packet whose transmission destination is rewritten to the external analysis device 3. Note that the process of generating a packet by the generation unit 13 includes a process of generating a new packet for analysis and a process of rewriting or deleting information in the input encapsulated packet to shape it into a packet for analysis.

Specifically, the generation unit 13 refers to the information of the processing defined for each group stored in the group processing DB 15 and performs the processing corresponding to the group for each grouped packet to generate packets for analysis.

Figure 4:
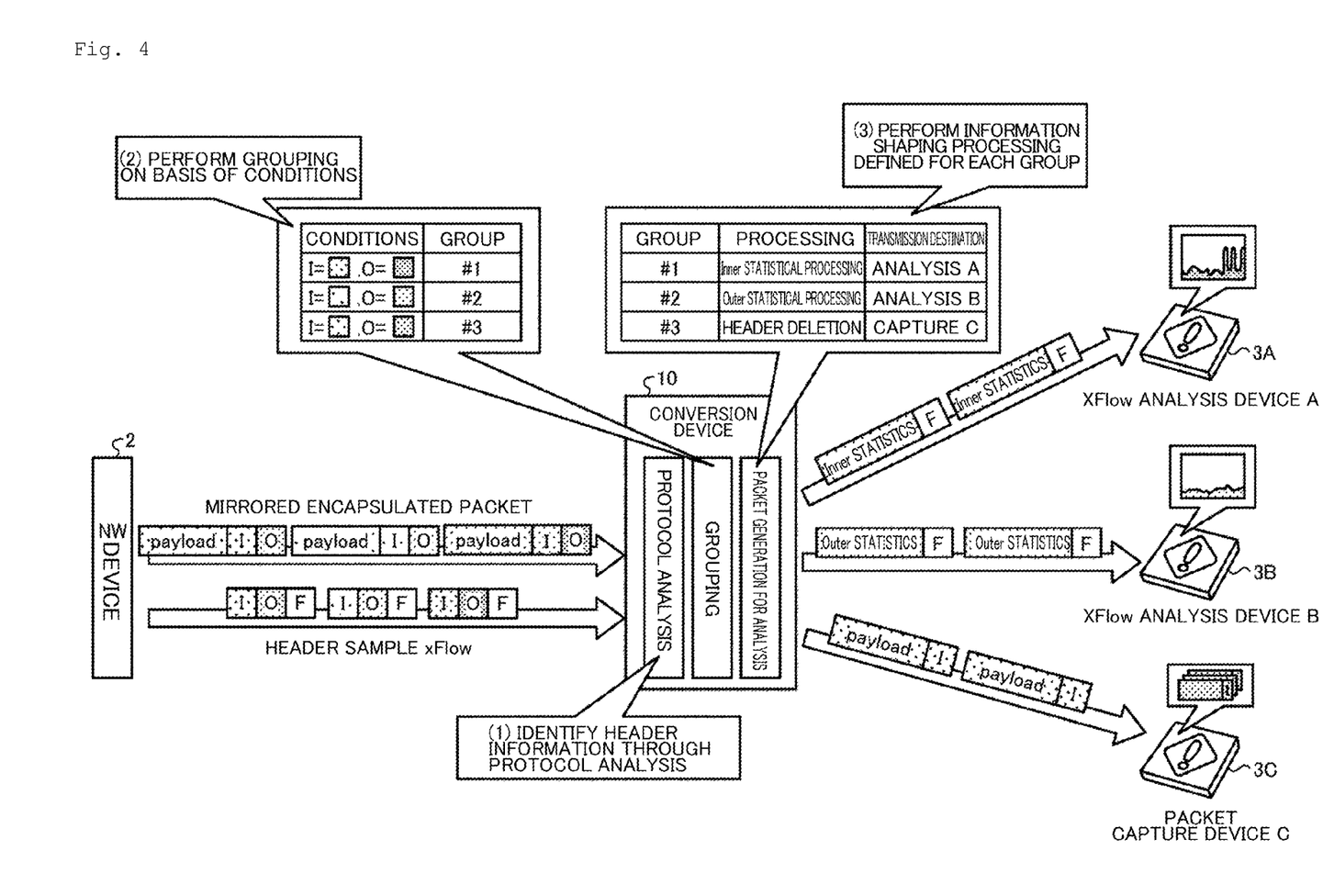
FIG. 4 is a diagram for explaining a flow for describing processing in the conversion device shown in FIG. 2.

Here, the flow of processing in the conversion device 10 will be described with reference to FIG. 4. FIG. 4 is a diagram for explaining the flow of processing in the conversion device shown in FIG. 2. As illustrated in FIG. 4, upon receiving an input of an encapsulated packet mirrored by the NW device 2 or an xFlow packet including a header sample, the conversion device 10 identifies header information by protocol analysis (refer to (1) in FIG. 4).

Also, the conversion device 10 groups the input packets on the basis of the grouping conditions (refer to (2) of FIG. 4). The example of FIG. 4 exemplifies a case in which the conversion device 10 classifies packets into one of a plurality of groups "Groups #1 to #3" on the basis of conditions relating to both the outer header and the inner header.

Subsequently, the conversion device 10 performs processing defined for each group (refer to (3) in FIG. 4). For example, in the example of FIG. 4, the conversion device 10 obtains inner header statistics for packets classified into Group "#1" and generates xFlow packets including at least statistical information indicating the inner header statistics. Furthermore, the conversion device 10 transmits the generated xFlow packet using xFlow analysis device 3A (also described as transmission destination "analysis A" in FIG. 4) as a transmission destination.

Also, for example, the conversion device 10 obtains statistics of inner headers for packets classified into Group "#2" and generates xFlow packets including at least statistical information indicating the statistics of the inner headers. Furthermore, the conversion device 10 transmits the generated xFlow packet using the xFlow analysis device 3B (also described as transmission destination "analysis B" in FIG. 4) as a transmission destination.

Also, for example, the conversion device 10 removes the outer header from the packets classified into Group "#3" and generates (shapes) the packets using the transmission destination rewritten to the external analysis device 3. Furthermore, the conversion device 10 transmits the generated packet using a packet capture device 3C (also described as transmission destination "capture C" in FIG. 4) as a transmission destination. Note that the conversion device 10 may generate and transmit a packet at any timing for each of the processes described above.

For example, when performing statistical processing like processing corresponding to Groups "#1" and "#2", the conversion device 10 performs statistical processing to generate and transmit packets when the number of grouped packets reaches a predetermined number. Also, for example, the conversion device 10 generates and transmits a packet each time it is grouped into Group "#3" when removing the outer header and rewriting the transmission destination to the external analysis device 3 as in the processing corresponding to Group "#3".

Furthermore, the conversion device 10 may automatically optimize the grouping conditions. That is, in the conversion device 10, for example, it is possible to minimize the number of times the conditions are referred to and improve the processing speed by optimizing the conditions when reading the set grouping conditions.

For example, in the grouping unit 12 of the conversion device 10, as grouping conditions, a plurality of conditions of the same kind may be set as conditions of the same group, and when it is possible to change to a higher-level condition which includes all of the plurality of conditions of the same type, the plurality of conditions of the same type may be changed to a higher-level condition.

Figure 5:
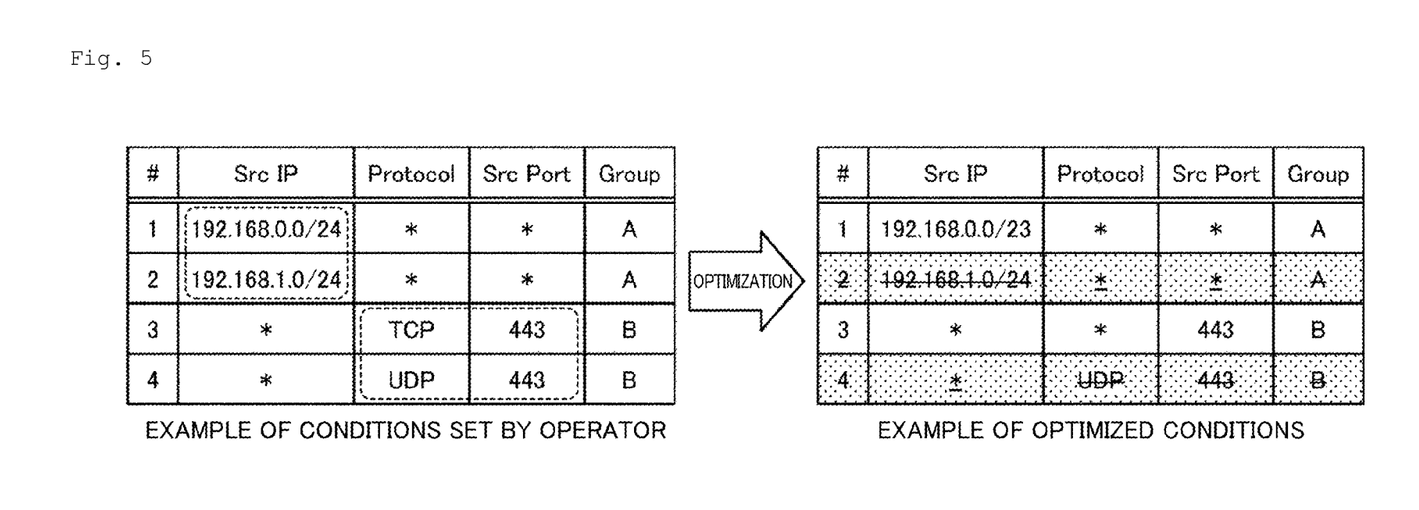
FIG. 5 is a diagram for explaining optimization processing of grouping conditions.

Here, the optimization processing of grouping conditions will be described using the example of FIG. 5. FIG. 5 is a diagram for explaining optimization processing of grouping conditions. As shown in FIG. 5, the grouping condition DB 14 stores a grouping condition "#1" in which the corresponding packet into group ID "A" is classified when the Src IP included in the inner header is within the range of "192.168.0.0/24" and a grouping condition "#2" for classifying the applicable packet into the group ID "A" when the Src IP included in the inner header is within the range of "192.168.1.0/24".

That is, both the grouping conditions "#1" and "#2" are classified into a group "A" using the Src IP as a condition and a plurality of conditions of the same kind are set as conditions of the same group.

In such a case, the grouping unit 12 includes both conditions "192.168.0.0/24" and "192.168.1.0/24" for the grouping conditions "#1" and "#2" and changes the upper condition to "192.168.0.0/23" which is the same condition. For example, in the example of FIG. 5, the grouping unit 12 performs optimization by changing the Src IP "192.168.0.0/24" of the grouping condition "#1" to "192.168.0.0/23" and deleting the grouping condition "#2". Note that the optimization method of the grouping unit 12 is not limited to the above processing, and for example, the grouping unit 12 may delete both the grouping conditions "#1" and "#2" and add a new grouping condition "#5" about condition in which the Src IP is "192.168.0.0/23".

Also, the grouping condition DB 14 stores a grouping condition "#3" in which the corresponding packet is classified into group ID "B" when the protocol contained in the inner header is "TCP" and the Src Port is "443" and a grouping condition "#4" in which the corresponding packet is classified into group ID "B" when the protocol included in the inner header is "UDP" and the Src Port is "443". That is, the grouping conditions "#3" and "#4" are both classified into a group "B" using protocol and Src Port as conditions and are set using a plurality of conditions of the same kind as conditions of the same group.

In such a case, the grouping unit 12 includes conditions for both protocols "TCP" and "UDP" for the grouping conditions "#3" and "#4", performs change to "*" which is a wild card as a higher-level condition and uses "443" as it is because the Src Port is common. For example, in the example of FIG. 5, the grouping unit 12 performs optimization by changing the protocol "TCP" of the grouping condition "#3" to "*" and deleting the grouping condition "#4".

[Processing Procedure of Conversion Processing]

Figure 6:
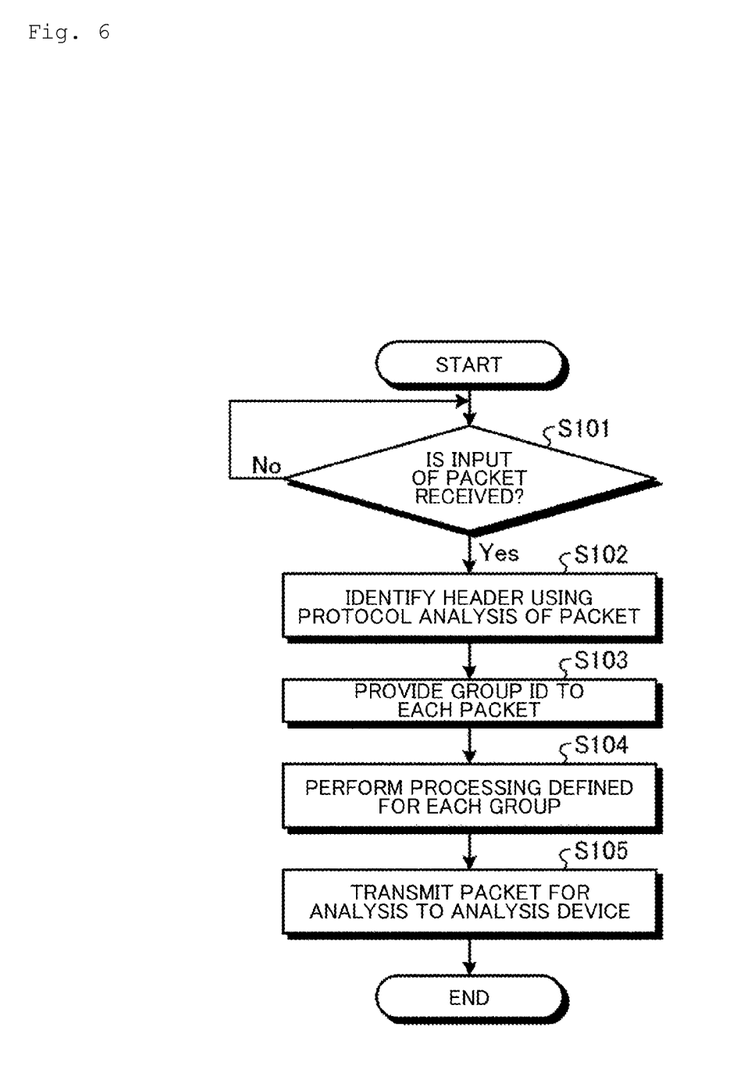
FIG. 6 is a flowchart for describing an example of a processing procedure of conversion processing according to the embodiment.

A processing procedure of packet conversion processing performed by the conversion device 10 will be described below. FIG. 6 is a flowchart for describing an example of a processing procedure of conversion processing according to the embodiment.

As shown in FIG. 6, when the packet analysis unit 11 of the conversion device 10 receives a packet input (Step S101; Affirmation), the packet analysis unit 11 identifies the header through protocol analysis of the packet (Step S102). For example, if receiving an input of an xFlow packet including a header sample which is the encapsulated packet or the header portion itself, the packet analysis unit 11 performs protocol analysis on the encapsulated packet or the xFlow packet, and identifies header information by extracting one or both of the outer header and the inner header.

Also, the grouping unit 12 provides a group ID to each packet (Step S103). For example, the grouping unit 12 classifies the packets into one of a plurality of groups on the basis of one or both of the outer header and the inner header, which are header information, as grouping conditions.

Subsequently, the generation unit 13 performs a process defined for each group (Step S104) and transmits packets for analysis to the analysis device 3 (Step S105). For example, the generation unit 13 refers to information about processing defined for each group stored in the group processing DB 15 and generates packets for analysis by performing a process corresponding to each grouped packet.

Effects of Embodiment

As described above, the conversion device 10 according to the embodiment analyzes an input packet and acquires header information included in the packet. Also, the conversion device 10 classifies the packets into one of the plurality of groups on the basis of the acquired header information and the set grouping condition. Subsequently, the conversion device 10 generates packets for analysis on the basis of processing corresponding to the classified groups. Therefore, the conversion device 10 can perform flexible processing and analysis which differ for each attribute of a business operator.

That is, the conversion device 10 can group input packets and perform different processing for each group, such as deleting the capsule outer packet header, statistical processing, and changing the transmission destination IP address, thereby flexibly performing individual processing and analysis for each attribute of the network user or the like.

The conversion device 10 identifies a packet on the basis of the packet header information in a network to which an encapsulated packet used by a plurality of business operators is transferred, and can perform different processing and analysis for each attribute of the business operators or the like.

About System Configuration of Embodiment

Each constituent element of the conversion device 10 shown in FIG. 1 is functionally conceptual and necessarily need not to be physically configured as shown. That is, the specific modes of distribution and integration of the functions of the conversion device 10 are not limited to those shown in the drawing and all or a part thereof can be functionally or physically distributed or integrated in arbitrary units according to various loads and usage conditions.

Also, each process performed in the conversion device 10 may be implemented entirely or in part by a CPU and a program which is analyzed and executed by the CPU. Also, each process performed in the conversion device 10 may be realized as hardware by wired logic.

In addition, of the processes described in the embodiments, all or a part of the processes described as being automatically performed can also be performed manually. Alternatively, all or a part of the processes described as being performed manually can be performed automatically by known methods. Besides, the above-described and illustrated processing procedures, control procedures, specific names, and information including various data and parameters can be changed as appropriate unless otherwise specified.

[Program]

Figure 7:
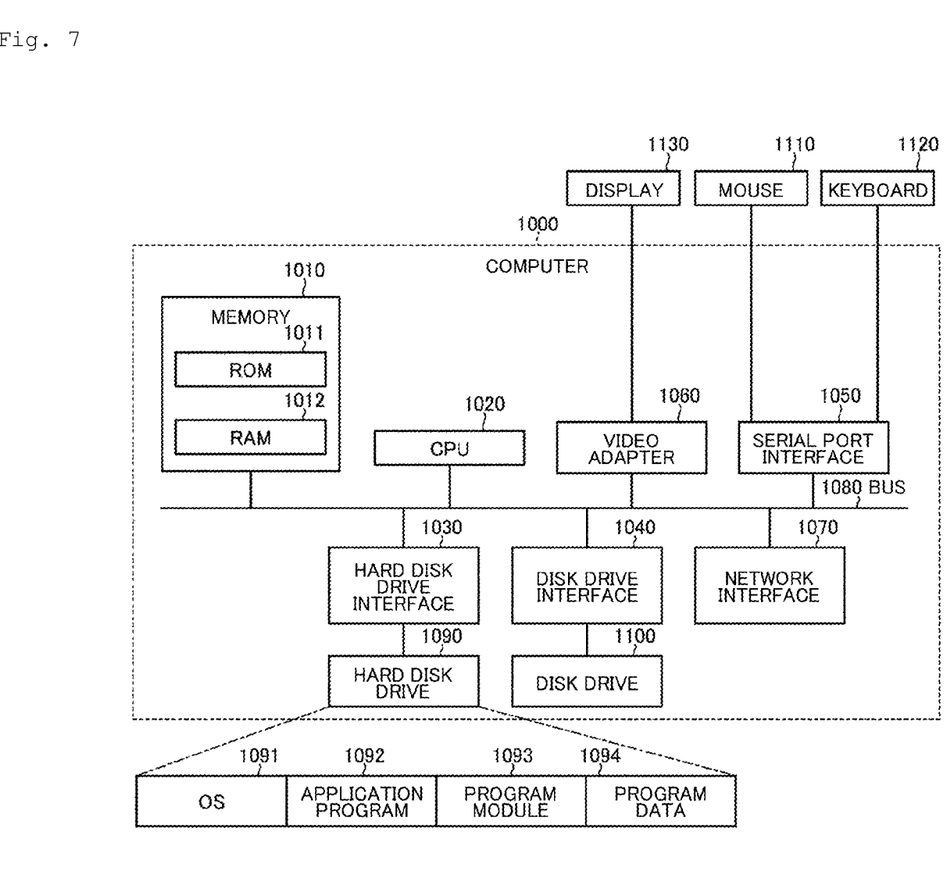
FIG. 7 is a diagram for describing an example of a computer which implements a conversion device by executing a program.

FIG. 7 is a diagram illustrating an example of a computer which implements the conversion device 10 by executing a program. A computer 1000 includes, for example, a memory 1010 and a CPU 1020. Also, the computer 1000 has a hard disk drive interface 1030, a disk drive interface 1040, a serial port interface 1050, a video adapter 1060, and a network interface 1070. These units are connected by a bus 1080.

A memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, a program which defines each process of the conversion device 10 is implemented as a program module 1093 in which a code which can be executed using the computer 1000 is described. The program module 1093 is stored in, for example, the hard disk drive 1090. For example, the hard disk drive 1090 stores a program module 1093 for performing processing similar to the functional configuration in the conversion device 10. Note that the hard disk drive 1090 may be replaced with a solid state drive (SSD).

Furthermore, the setting data used in the processing of the above-described embodiment is stored, for example, in the memory 1010 or the hard disk drive 1090 as the program data 1094. Also, the CPU 1020 reads the program module 1093 and the program data 1094 stored in the memory 1010 or the hard disk drive 1090 into the RAM 1012 and performs them as necessary.

Note that the program module 1093 and the program data 1094 are not limited to being stored in the hard disk drive 1090 and may be stored in a removable storage medium, for example, and read using the CPU 1020 via disk drive 1100 or the like. Alternatively, the program module 1093 and the program data 1094 may be stored in another computer connected via a network (local area network (LAN), a wide area network (WAN), or the like). Moreover, the program module 1093 and the program data 1094 may be read using the CPU 1020 via the network interface 1070 from other computers.

Although the embodiments to which the invention made by the present inventor is applied have been described above, the present invention is not limited by the descriptions and drawings forming part of the disclosure of the present invention according to the embodiments. That is, other embodiments, examples, operation techniques, and the like made by those skilled in the art on the basis of the embodiment are all included in the scope of the present invention.

REFERENCE SIGNS LIST

1 Communication system
2 NW device
3 Analysis device
10 Conversion device
11 Packet analysis unit
12 Grouping unit
13 Generation unit
14 Grouping condition DB
15 Group processing DB

The invention claimed is:

1. A conversion device, comprising:
an analysis unit, including one or more processors, configured to analyze input packets and acquires header information included in each of the packets;
a grouping unit, including one or more processors, configured to classify the packets into one of a plurality of groups on the basis of the header information acquired using the analysis unit and set grouping conditions; and
a generation unit, including one or more processors, configured to generate packets for analysis on the basis of processing corresponding to the groups classified using the grouping unit.

2. The conversion device according to claim 1, wherein the grouping unit is configured to classify the packets into one of a plurality of groups on the basis of conditions relating to either one or both of an outer header and an inner header, which are the header information, as the grouping conditions.

3. The conversion device according to claim 1, wherein the grouping unit has a plurality of conditions of the same kind set as conditions for the same group as the grouping conditions and is configured to change the plurality of conditions of the same kind to higher-level conditions when the condition can be changed to a higher-level condition which includes all of the plurality of conditions of the same kind.

4. The conversion device according to claim 1, wherein the generation unit is configured to acquire statistics of inner headers as processing corresponding to the group, obtain a process of generating a packet including at least statistical information indicating statistics of the inner header and statistics of the outer header, remove a process of generating a packet including at least statistical information indicating statistics of the outer header and the outer header, and perform any one or a plurality of processes of generating a packet whose transmission destination is rewritten to an external analysis device.

5. A conversion method performed by a conversion device, comprising:
analyzing input packets and acquiring header information included in each of the packets;
classifying the packets into one of a plurality of groups on the basis of the header information and setting grouping conditions; and
a generation step of generating packets for analysis on the basis of processing corresponding to the groups.

6. A non-transitory computer readable medium storing one or more instructions causing a computer to execute:
analyzing input packets and acquiring header information included in each of the packets;
classifying the packets into one of a plurality of groups on the basis of the header information and setting grouping conditions; and
generating packets for analysis on the basis of processing corresponding to the groups.

7. The conversion method according to claim 5, comprising:
classifying the packets into one of a plurality of groups on the basis of conditions relating to either one or both of an outer header and an inner header, which are the header information, as the grouping conditions.

8. The conversion method according to claim 5, wherein there are plurality of conditions of the same kind set as conditions for the same group as the grouping conditions and
the method comprising:
changing the plurality of conditions of the same kind to higher-level conditions when the condition can be changed to a higher-level condition which includes all of the plurality of conditions of the same kind.

9. The conversion method according to claim 5, comprising:
acquiring statistics of inner headers as processing corresponding to the group, obtaining a process of generating a packet including at least statistical information indicating statistics of the inner header and statistics of the outer header, removing a process of generating a packet including at least statistical information indicating statistics of the outer header and the outer header, and performing any one or a plurality of processes of generating a packet whose transmission destination is rewritten to an external analysis device.

10. The non-transitory computer readable medium according to claim 6, wherein the one or more instructions cause the computer to execute:
classifying the packets into one of a plurality of groups on the basis of conditions relating to either one or both of an outer header and an inner header, which are the header information, as the grouping conditions.

11. The non-transitory computer readable medium according to claim 6, wherein there are a plurality of conditions of the same kind set as conditions for the same group as the grouping conditions, and
the one or more instructions cause the computer to execute:
changing the plurality of conditions of the same kind to higher-level conditions when the condition can be changed to a higher-level condition which includes all of the plurality of conditions of the same kind.

12. The non-transitory computer readable medium according to claim 6, wherein the one or more instructions cause the computer to execute:
    acquiring statistics of inner headers as processing corresponding to the group, obtaining a process of generating a packet including at least statistical information indicating statistics of the inner header and statistics of the outer header, removing a process of generating a packet including at least statistical information indicating statistics of the outer header and the outer header, and performing any one or a plurality of processes of generating a packet whose transmission destination is rewritten to an external analysis device.

\* \* \* \* \*